(12) United States Patent
Wu et al.

(10) Patent No.: US 9,498,032 B2
(45) Date of Patent: Nov. 22, 2016

(54) CASE FOR A PORTABLE ELECTRONIC DEVICE WITH HARD TACTILE BUTTONS

(71) Applicant: Samsonite IP Holdings S.àr.l., Luxembourg (LU)

(72) Inventors: Arthur Wu, San Francisco, CA (US); Alex Ringrose, Oakland, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 0 days.

(21) Appl. No.: 14/061,705

(22) Filed: Oct. 23, 2013

(65) Prior Publication Data

US 2014/0110275 A1      Apr. 24, 2014

Related U.S. Application Data

(60) Provisional application No. 61/717,280, filed on Oct. 23, 2012.

(51) Int. Cl.
*A45C 11/00*    (2006.01)
*H04M 1/04*    (2006.01)
*H04M 1/23*    (2006.01)

(52) U.S. Cl.
CPC .......... *A45C 11/00* (2013.01); *A45C 2011/002* (2013.01); *H04M 1/04* (2013.01); *H04M 1/236* (2013.01)

(58) Field of Classification Search
CPC ................................ A45C 11/00; H04M 1/23

USPC ............ 206/320, 316.2, 37; 455/575.1, 575, 455/575.8; 396/27, 25; 361/679.01; 379/330
See application file for complete search history.

(56) References Cited

U.S. PATENT DOCUMENTS

| | | | |
|---|---|---|---|
| 9,125,476 B2* | 9/2015 | Chen ...................... | B60R 11/02 |
| 2011/0073505 A1* | 3/2011 | Stiehl .......................... | 206/320 |
| 2012/0018325 A1* | 1/2012 | Kim ............................ | 206/320 |
| 2012/0261289 A1* | 10/2012 | Wyner et al. ................ | 206/320 |
| 2013/0040711 A1* | 2/2013 | Kim .................... | H04M 1/0214 455/575.1 |
| 2013/0271902 A1* | 10/2013 | Lai et al. ................. | 361/679.01 |

* cited by examiner

*Primary Examiner* — Anthony Stashick
*Assistant Examiner* — Raven Collins
(74) *Attorney, Agent, or Firm* — Frommer Lawrence & Haug LLP

(57) ABSTRACT

A case for enclosing a personal electronic device is disclosed that has at least one button molded into the case, wherein the button is manufactured from rigid material that may or may not deform when depressed. The case, whether hard or soft, may incorporate the buttons manufactured from a hard material and afford the user the same tactile response as if the user were depressing the underlying buttons on the device. The case may be co-molded with two similar or dissimilar materials. One of the co-molded materials may provide a membrane that allows the button to flex and also secures the buttons to prevent them from being dislodged from or out of the case.

7 Claims, 8 Drawing Sheets

CASE FOR A PORTABLE ELECTRONIC DEVICE WITH HARD TACTILE BUTTONS

CROSS REFERENCE TO RELATED APPLICATION

This application claims priority of U.S. Provisional Application Ser. No. 61/717,280, filed Oct. 23, 2012, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The present disclosure relates generally to cases for enclosing a portable electronic device. More specifically, the present disclosure relates to such cases that include hard tactile buttons for use on the cases, including co-molded cases.

SUMMARY

Most personal electronic devices ("PEDs"), e.g., a cell phone, smartphone, tablet style device, book reader, PDA, or similar device, utilize at least one physical button on the device. For example, a physical button may be employed to control volume, power, or to activate the device's screen. Even with the expansion of the use of touch screen technology, physical buttons are not expected to be eliminated from such devices given their utility, quick access, and ease of use.

Users of PEDs often wish to protect such devices with a case to protect against potential damage, drops, and exposure to elements. To accommodate the physical buttons ("buttons") of a device, such cases require either that 1) the area surrounding the buttons be cutouts so that a user can access the buttons on the device directly, or 2) the case be configured with buttons built into the case that overlay the actual button on the device.

The first option, where the area surrounding the buttons are cutouts so that a user can access the buttons on the device directly, provides little to no protection for the area of the device that is now exposed to the elements. Such exposure is especially problematic when the opening exposes, e.g., a device camera, switch, or other non-waterproof device feature.

In the configuration where a case is configured with buttons built into the case overlaying the actual button on the device, the buttons built into the case are often molded from soft, flexible, and deformable materials. These flexible buttons may be molded directly into the case or may be added as an additional component of the case. In either configuration, the flexible buttons do not offer the same tactile response as the actual buttons themselves, and often deform under pressure when pressed by the user. Moreover, the typical flexible buttons do not provide sufficient tactile feedback to the user to ensure that the actual button underneath the flexible button has been activated.

Accordingly, a need exists for a case for a personal electronic device with user buttons that provide the user with the same touch, feel, and response that the actual button on the device would otherwise provide, while still providing protection for the device.

Therefore, in an embodiment, a case for enclosing a personal electronic device comprises a case and at least one button molded into the case, wherein the button is manufactured from material that is more rigid than the surrounding case material. Such rigid materials may be, for example, plastic or metal, or any other material suitable for providing the requisite rigidity. In some embodiments, the button material may prevent the button from deforming under the user's finger.

In an embodiment, a case, whether hard or soft, incorporates the buttons manufactured from a hard material that affords the user the same tactile response as if the user were depressing the underlying buttons on the device.

In some embodiments, a case may be co-molded. For example, case buttons may be first injected or "shot" in a harder material and then inserted into a secondary tool to be covered with a softer material. The second shot may provide a membrane that allows the button to flex and also secures the buttons to prevent them from being dislodged or popped out of the case.

In some embodiments, the hard material of the buttons are colored in such a way as to contrast the surrounding case. This provides both a visual aesthetic appeal as well as enabling the user to quickly and easily locate the necessary buttons on the underlying device when required.

DETAILED DESCRIPTION

According to embodiments, cases for enclosing a portable electronic device ("PED") are disclosed herein. The cases may be constructed from one piece or may comprise multiple pieces. Cases of the present disclosure may be a folio type case with a front and back cover, or may be snap-fit type cases with only a back and sides. The cases may be used for, e.g., a cell phone, smartphone, tablet style device, book reader, PDA, or similar device.

The cases may be molded from a single material or from multiple materials. The materials of the case may be co-molded at the same time or may be manufactured in pieces and assembled using other known manufacturing processes. The case of the present disclosure may be molded from a hard or soft material and may contain one or more buttons to control the buttons or controls on the PED enclosed within the case.

In an embodiment of the present disclosure, the case, whether hard or soft, incorporates buttons manufactured from a hard material that affords the user the same tactile response as if the user were depressing the underlying buttons on the device.

Figure 1:
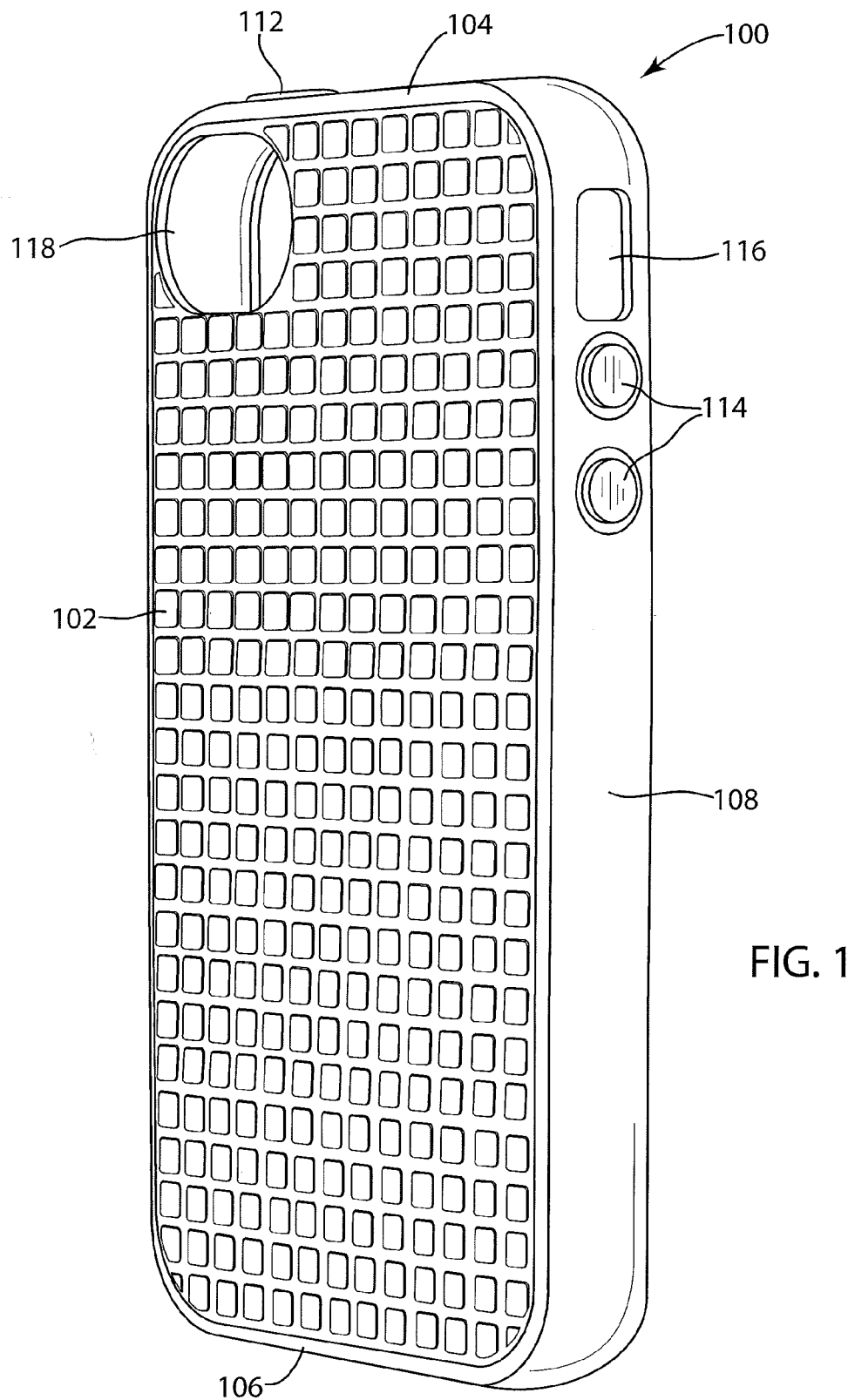
FIG. 1 depicts exterior portions of a case with hard buttons in a color that contrasts the color of the case, in accordance with an embodiment of the present disclosure.

FIG. 1 depicts exterior portions of a case with hard buttons in a color that contrasts the color of the case, in accordance with an embodiment of the present disclosure. In an embodiment, case 100 comprises a front exterior panel 102, top exterior panel 104, bottom exterior panel 106, right side exterior panel 108, left side exterior panel 110 (not shown), and interior panel 120 (shown in FIG. 2).

According to embodiments, case 100 may comprise cut-outs 116 and 118 for, e.g., openings for device cameras, rocker switches, or other buttons that are not covered or protected by case 100, and buttons 114 built into the case to cover device buttons that do require coverage/protection.

According to embodiments, buttons 114 may be of a different color, or contrasting color or shade, than case 110 or surrounding panels 102, 104, 106, 108, and/or 110 to provide both a visual aesthetic appeal and enable the user to quickly and easily locate the necessary buttons on the device when required.

According to embodiments, buttons 114 may be used to control the volume switches of a device, or any other physical button of the device.

Figure 2:
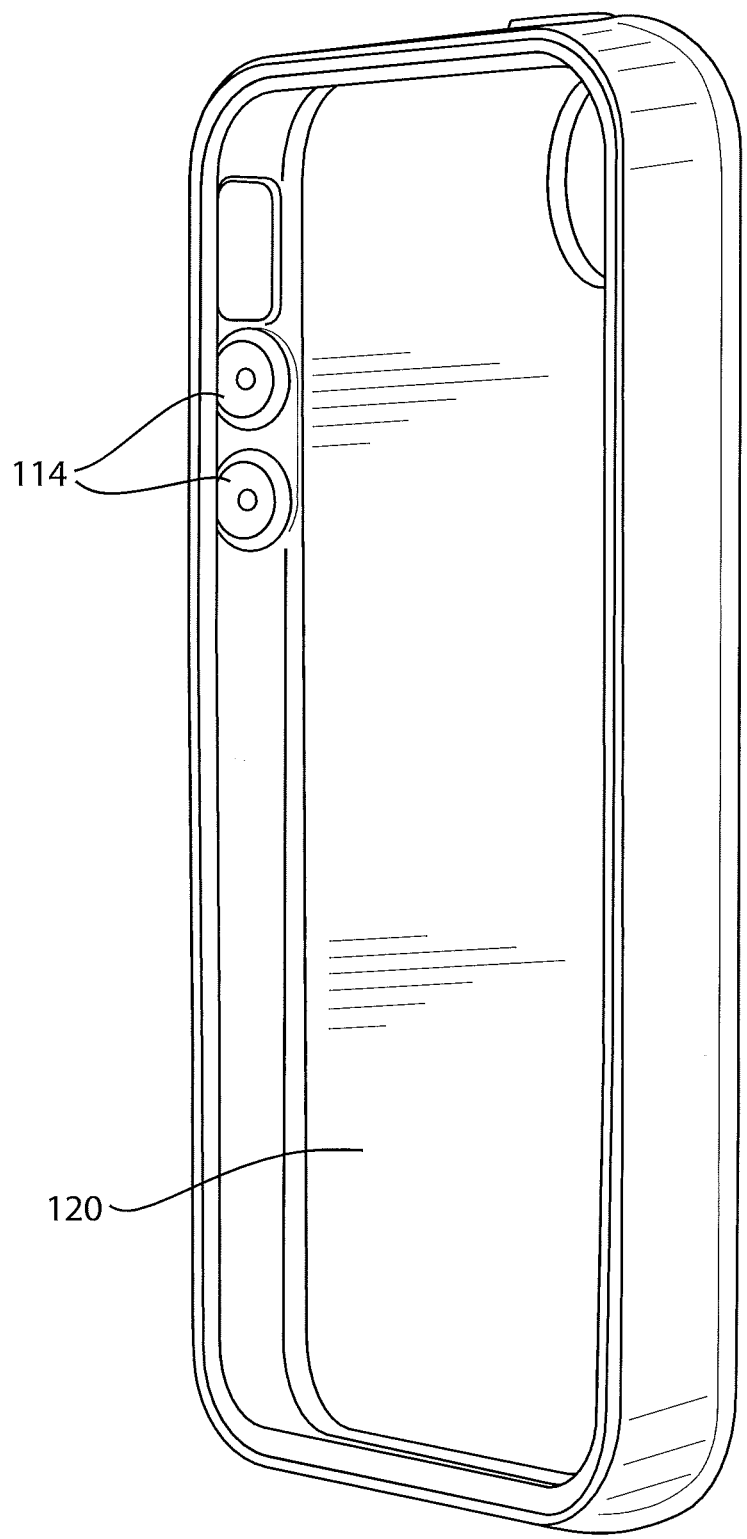
FIG. 2 depicts interior portions of a case with hard buttons, in accordance with an embodiment of the present disclosure.

FIG. 2 depicts interior portions of a case with hard buttons, in accordance with an embodiment of the present disclosure. A PED may be inserted into the interior portion and held in place by the case itself or any other attachment or securing means, with the device features, e.g., volume buttons, power buttons, camera, etc. aligned with the respective case buttons and openings of a given case.

As depicted in FIG. 2, buttons 114 are hard buttons that are not deformable and, and in embodiment, directly contact the device buttons. As mentioned previously, these hard buttons with direct device contact may provide sufficient tactile feedback to the user to ensure that the actual button underneath the flexible button has been activated.

Figure 3:
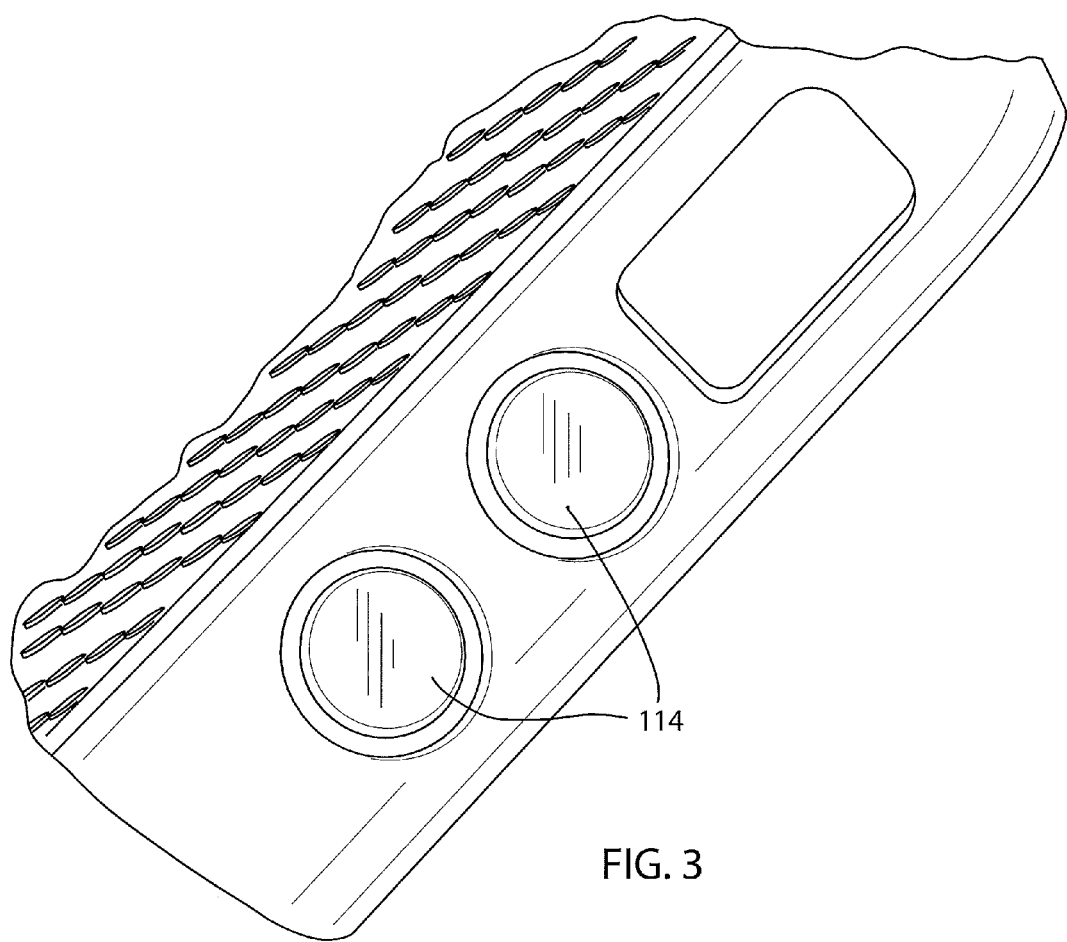
FIG. 3 depicts a close-up of hard buttons of a case from the side/exterior of a case, in accordance with an embodiment of the present disclosure.
Figure 4:
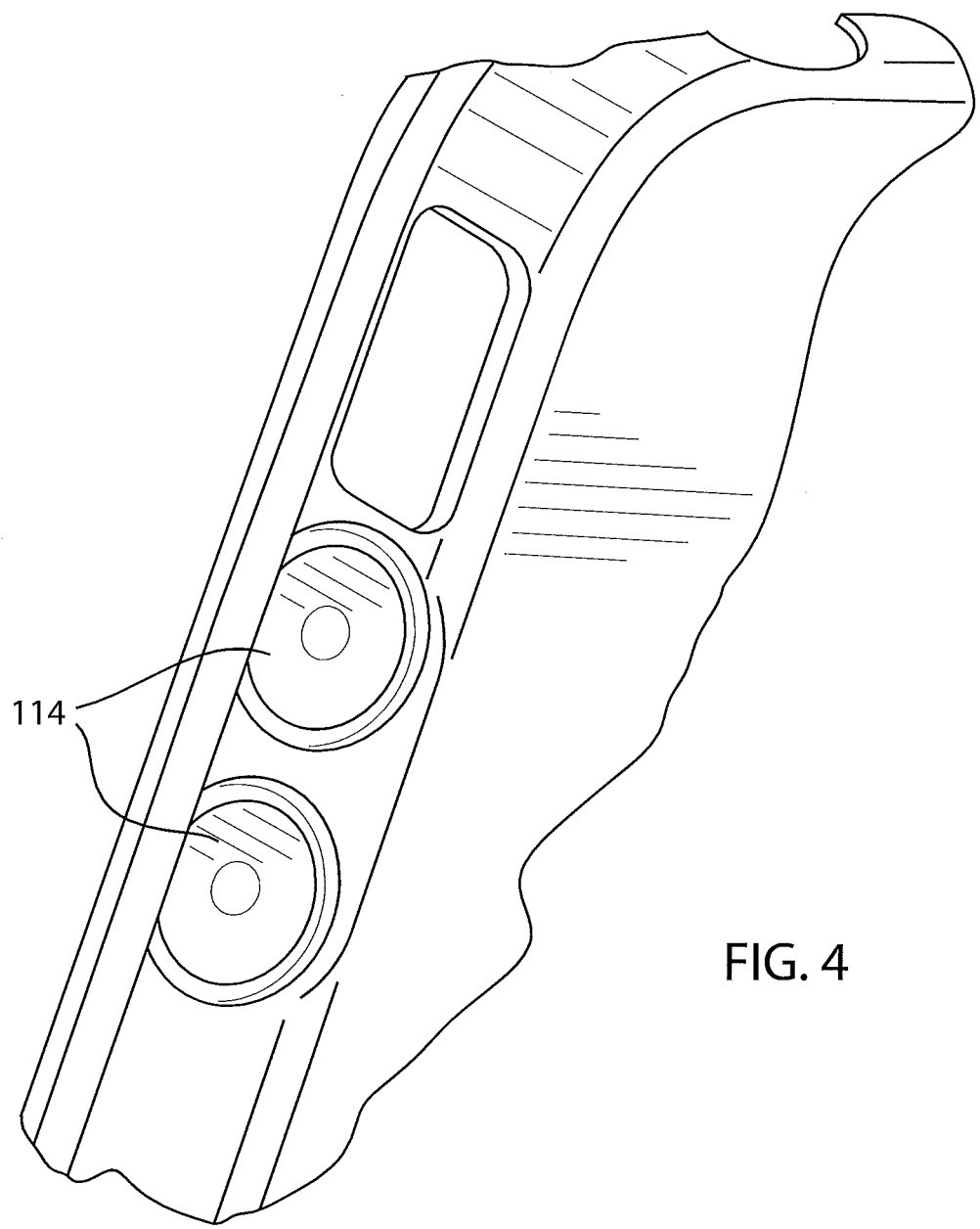
FIG. 4 depicts a close-up of hard buttons of a case from the side/interior of a case, in accordance with an embodiment of the present disclosure.

FIG. 3 depicts a close-up of hard buttons of a case from the side/exterior of a case, in accordance with an embodiment of the present disclosure, while FIG. 4 depicts a close-up of hard buttons of a case from the side/interior of a case, in accordance with an embodiment of the present disclosure. As depicted in FIGS. 3 and 4, buttons 114 may be co-molded in an embodiment.

Figure 5:
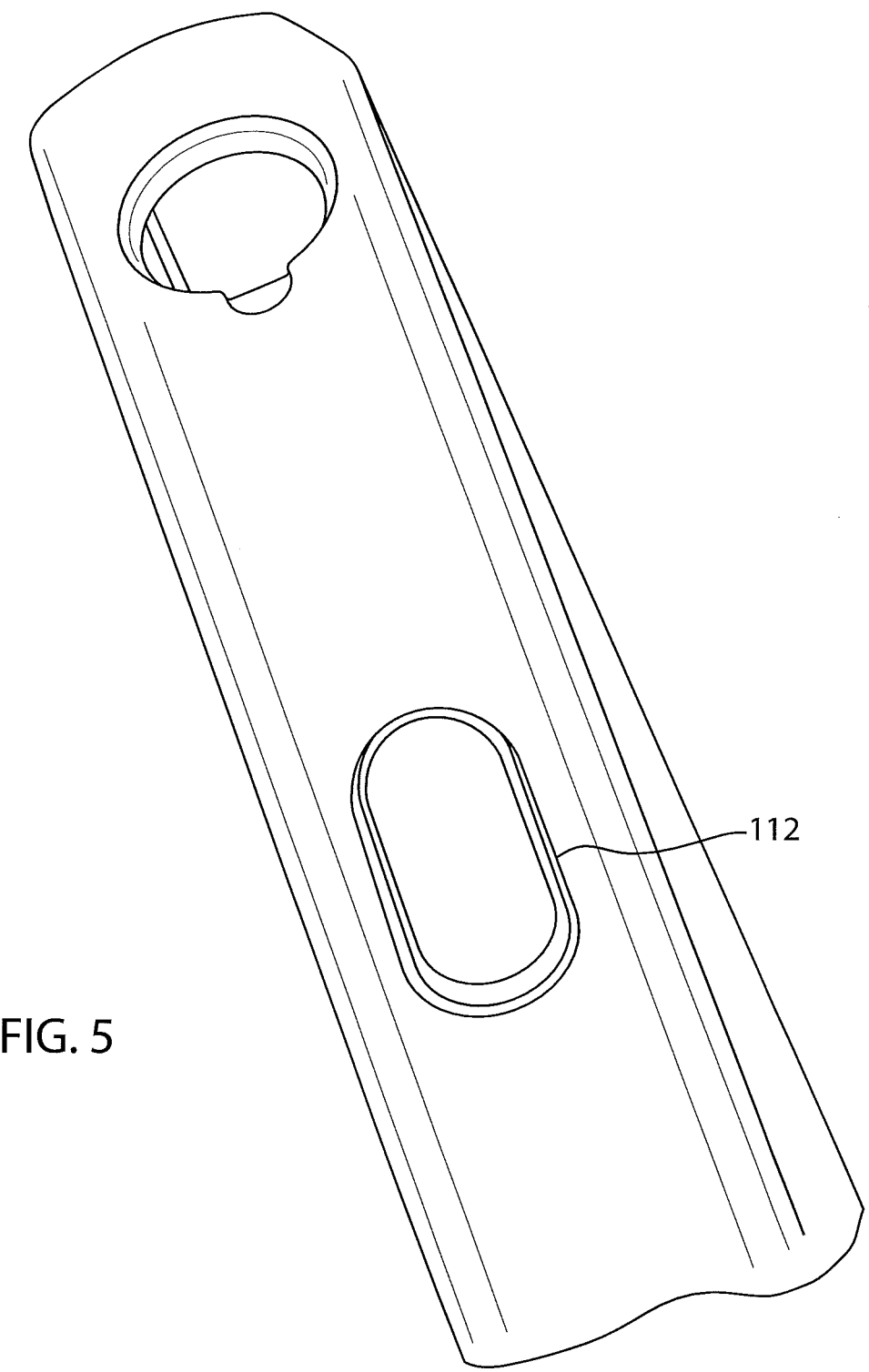
FIG. 5 depicts a close-up of a hard button of a case from the top/exterior of a case, in accordance with an embodiment of the present disclosure.
Figure 6:
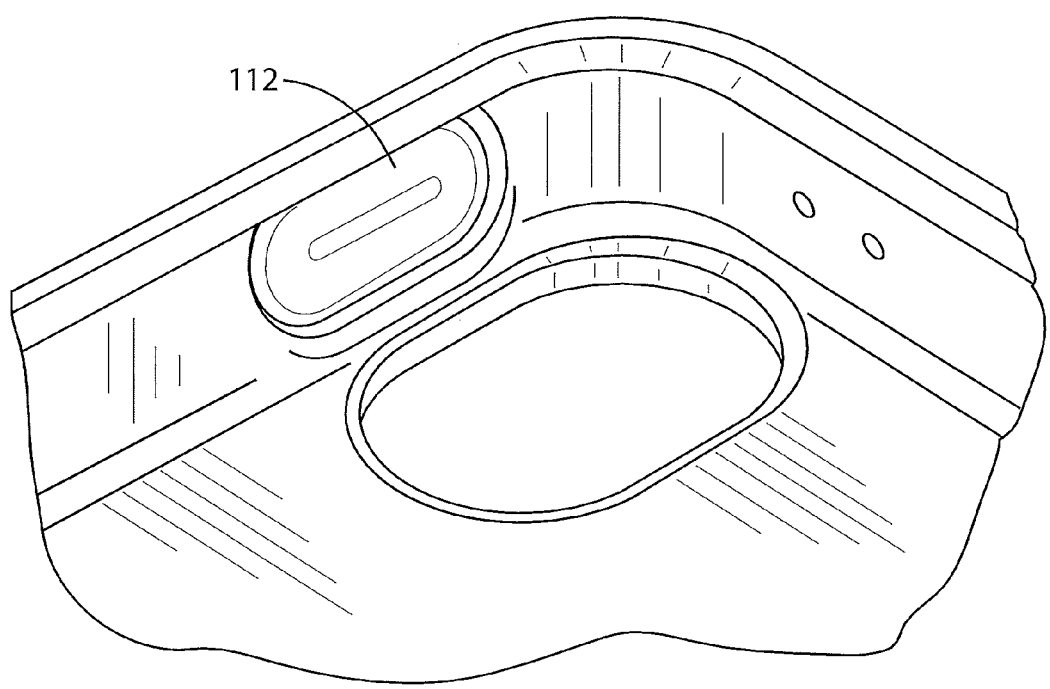
FIG. 6 depicts a close-up of a hard button of a case from the top/interior of a case, in accordance with an embodiment of the present disclosure.

FIG. 5 depicts a close-up of a hard button of a case from the top/exterior of a case, in accordance with an embodiment of the present disclosure, and FIG. 6 depicts a close-up of a hard button of a case from the top/interior of a case, in accordance with an embodiment of the present disclosure. According to embodiments, button 112 may be used to control the power switch of a device, or any other physical button of the device, e.g., a button to activate the device or activate the device's screen.

Figure 7:
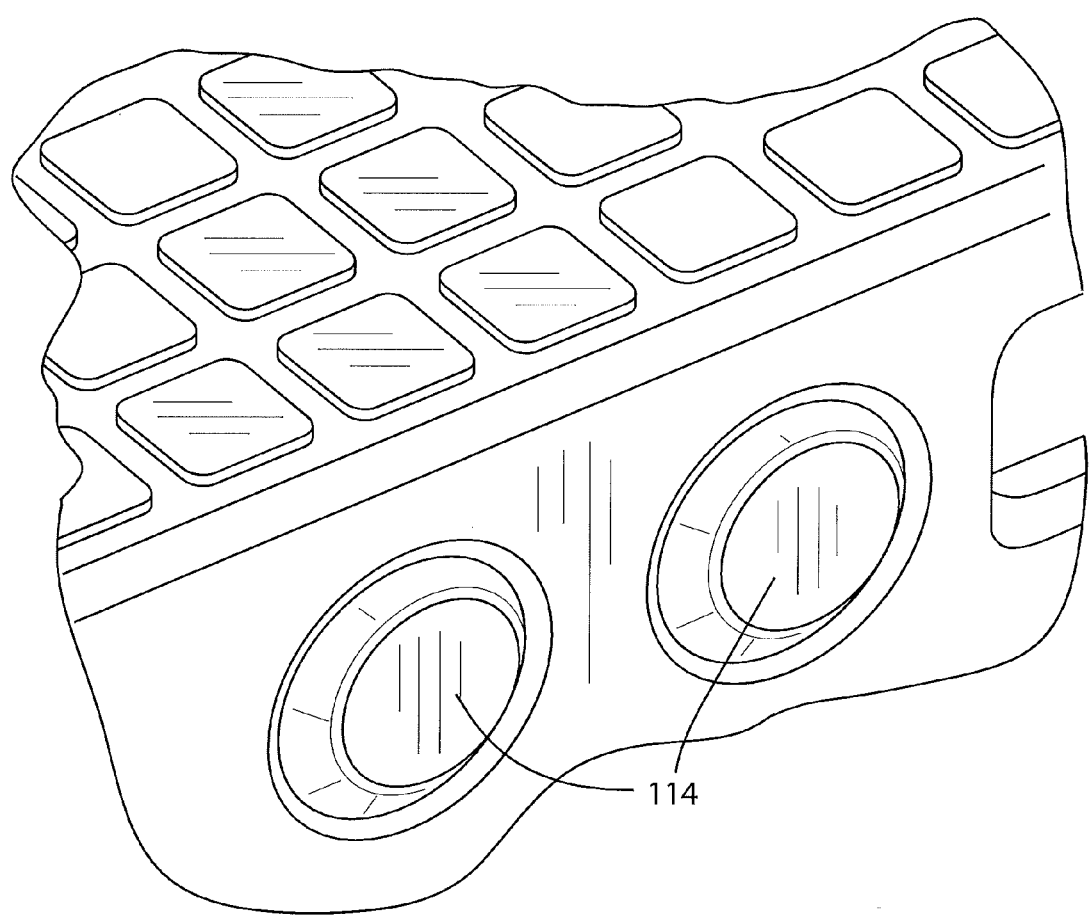
FIG. 7 depicts a close-up of hard buttons of a case from the side/exterior of a case, in accordance with an embodiment of the present disclosure.
Figure 8:
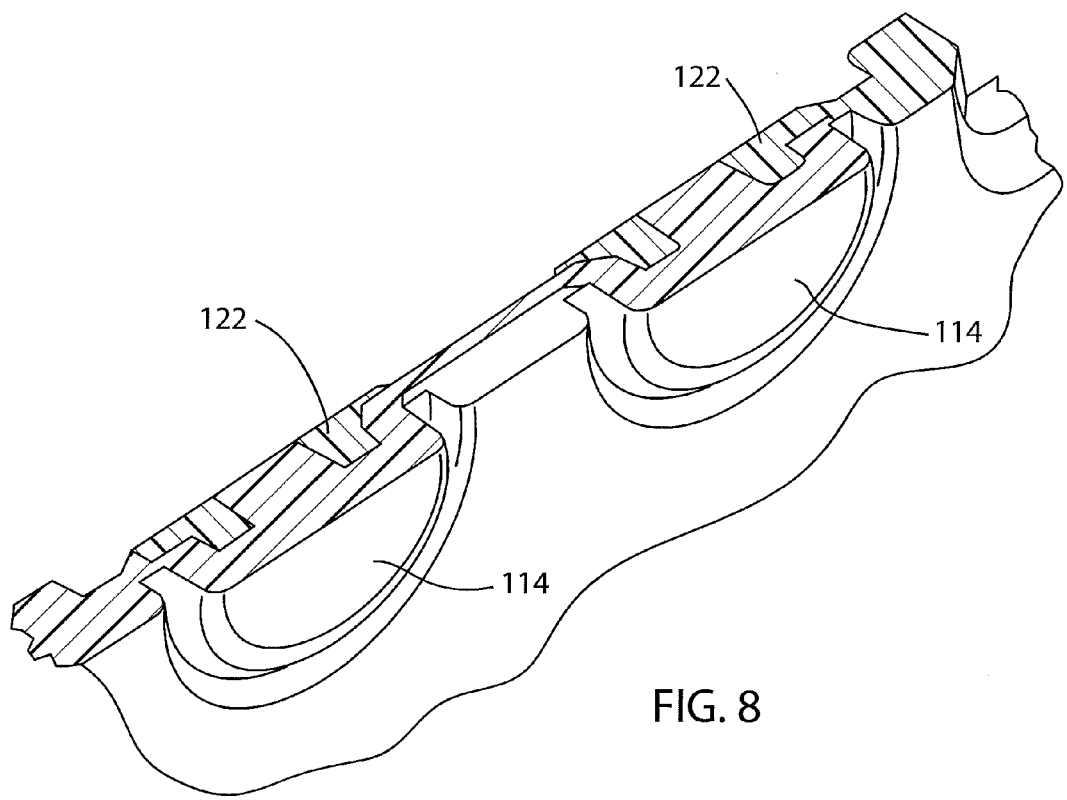
FIG. 8 depicts a cutaway view of hard buttons of a case, in accordance with an embodiment of the present disclosure.

FIG. 7 depicts a close-up of hard buttons of a case from the side/exterior of a case, in accordance with an embodiment of the present disclosure, including buttons 114 (shown in cutaway view in FIG. 8).

FIG. 8 depicts a cutaway view of hard buttons of a case, in accordance with an embodiment of the present disclosure. According to an embodiment, the case may have a soft, e.g., plastic, rubber, or polymer case, or a hard case, with integrated hard tactile buttons manufactured from, e.g., plastic or metal, or other material of suitable rigidity. In various embodiments, therefore, the case surrounding the hard buttons may be manufactured from similar or dissimilar materials as the hard buttons.

In the embodiment of FIG. 8, the case and hard buttons may be co-molded. Case buttons 114 may be first injected or "shot" in a harder material and then inserted into a secondary tool to be covered with a softer material. The second shot may provide a membrane 112 that allows the buttons 114 to flex, and also secures the buttons to prevent them from being dislodged or popped out of the case.

In various embodiments, hard buttons 114 may be inserted during the molding process in a plastic or rubber case or housing. This provides a hard tactile button as opposed to a soft flexible button. The hard buttons may be manufactured as a separate component and inserted into a mold such that they are co-molded with an otherwise flexible case. Alternatively, the case itself may be co-molded with multiple materials and the hard buttons may be further incorporated into the case utilizing any known method, such as co-molding, insert molding, dual injection, welding, chemical bonding, adhesion, mechanical fixation, heat fixation, ultrasonic welding, or any other known process.

In an embodiment, the hard buttons 114 (or 112, etc.) allow hard contact between buttons 114 and buttons on a device, and avoids the deformations typically found when utilizing a flexible button. More specifically, in an embodiment, the button molded into the case is in direct contact with the underlying device button on the personal electronic device. That is, there is no air space or gap between the rigid button on the case and the device button. In this manner, the tactile feedback from the underlying device button is not dampened when the case button is depressed, avoiding the result of cases which incorporate an intervening membrane between a case button and a device button.

According to an embodiment, the purpose of the hard button is to convey the user's motion of depressing the button to the underlying PED. Accordingly, in such embodiments, any hard button utilized in accordance with the present disclosure must be sized such that it contacts the underlying button during the depression phase and releases during the released phase.

In some embodiments, the case buttons may be further textured to enhance the tactile sensation, while in other embodiments, the hard buttons are manufactured of contrasting colors, providing the user with an aesthetic color break on the surface of the case.

While the invention has been described and illustrated in connection with embodiments, many variations and modifications as will be evident to those skilled in this art may be made without departing from the spirit and scope of the invention as defined by the claims, and the invention is thus not to be limited to the precise details of methodology or construction set forth above as such variations and modifications are intended to be included within the scope of the invention as defined by the claims.

The invention claimed is:

1. A case for enclosing a personal electronic device, comprising:
   a case; and
   at least one button molded into the case, wherein the at least one button is manufactured from a rigid material and is co-molded, insert molded, or dual injected with the case; and wherein the case comprises a first material, and the at least one button comprises a second material.

2. The case of claim 1;

wherein the first material secures the at least one button.

3. A case for enclosing a personal electronic device, comprising:

a case; and at least one button molded into the case, wherein the at least one button is manufactured from a rigid material and is co-molded, insert molded, or dual injected with the case; and wherein the rigid material of the button is more rigid than material of the case surrounding the button.

4. The case of claim 1;

wherein the button is made from at least one of the following materials:

plastic and metal.

5. The case of claim 1;

wherein the button molded into the case is in direct contact with a device button on the personal electronic device.

6. The case of claim 3;

wherein the button is made from at least one of the following materials:

plastic and metal.

7. The case of claim 3;

wherein the button molded into the case is in direct contact with a device button on the personal electronic device.

* * * * *